3,132,111
PROCESS FOR THE PREPARATION
OF A CATALYST
Henry Erickson, Park Forest, and Marvin F. L. Johnson, Homewood, Ill., and Carl D. Keith, Summit, N.J., assignors, by mesne assignments, to Sinclair Research Inc., New York, N.Y., a corporation of Delaware
No Drawing. Filed Mar. 31, 1960, Ser. No. 18,873
5 Claims. (Cl. 252—464)

This invention relates to a method of improving the hydrotreating characteristics of macrosize calcined alumina based catalysts containing catalytically active metal components.

Much work has been done with respect to catalysts to enhance their chemical and physical properties. As tons of catalytic material are used in petroleum refining processes, extensive research work has been directed toward methods of preparing the catalytic base, the chemical composition of the base, and the choice of the catalytic promoting material. The petroleum industry is always searching for an improved catalyst material which is relatively inexpensive and has high catalyst activity and resistance to loss in activity over a long processing period. Several methods have been suggested for increasing catalyst activity, the strength of catalyst particles and their resistance to deterioration. One process for catalyst improvement involves double impregnation where a finely divided catalyst base is impregnated with a promoting metal component, dried, calcined, impregnated again with the catalytic promoting material and then pelleted prior to recalcination. However, this multiple impregnation of the catalyst base supplies a product whose catalytic characteristics can be improved upon, for instance with respect to the desulfurization of normally liquid petroleum hydrocarbons. It is desirable that in certain processes, such as fixed bed desulfurization processes, the catalyst be present as macrosized particles ranging from about $\frac{1}{16}''$ to $\frac{1}{2}''$ in diameter and about $\frac{1}{16}''$ to 1'' or more in length.

In accordance with the present invention, we have found that macrosize catalysts of the activated alumina base type having deposited thereon certain metals as catalytically active components, may be greatly enhanced as to their hydrocarbon hydrotreating activity and aging stability by forming macrosize particles from finely divided alumina containing the metals, calcining the formed particles, contacting again the calcined macro particles with an additional amount of the catalytic active metals and then recalcining the catalyst. If desired, the catalyst material may be dried in a separate operation prior to calcining initially and/or prior to the subsequent calcination. In a preferred embodiment of this invention, a finely divided alumina hydrate is contacted with the metal component in an aqueous medium and then formed into macrosize particles by tabletting or extrusion. These particles are then calcined to obtain activated alumina, impregnated again with the same or a different aqueous metal component and then recalcined. Thus, by the process of this invention, superior hydrotreating, e.g. hydrodesulfurization, hydrofinishing, hydrocracking, etc., catalysts, containing catalytically active metal components are obtained. Although we are not certain of why such catalysts should exhibit enhanced characteristics as compared, for instance with catalysts made by double impregnation prior to formation of the macrosize particles, this result may be due to the distribution of promoting metal in the particles. Thus our method seems to provide the metal throughout the catalyst particles as the result of the initial impregnation and also gives a high metals concentration at the particle surface due to the second impregnation. Perhaps the metal gradient so provided is responsible for our unusual result.

The catalyst support or base is alumina. In the method of this invention activated alumina or alumina hydrate, preferably the latter, in small or finely divided form is mixed with an aqueous medium containing the catalytically active metal. As an example, the initial alumina base can be any of the hydrate forms such as the monohydrate, trihydrate or hydrous amorphous alumina; for instance, an effective catalyst base precursor may comprise up to about 95% of trihydrate and about 5 to 100% of other hydrous aluminas in the form of alumina monohydrate, e.g., boehmite, as detected by X-ray analysis after drying or in the form of amorphous hydrous alumina or mixtures of these forms. A preferred base contains about 10 to 50% of the trihydrate and about 90 to 50% of the amorphous or monohydrate forms. The alumina base can contain minor amounts usually up to about 25 or 35% of promoting or stabilizing constituents as, for instance, silica, titania, zirconia, thoria, etc.

In each impregnation step the metallic components may be added to the catalyst support by any procedure desired but usually in both steps an aqueous medium is employed. As an example impregnation may be effected by the use of an aqueous slurry containing relatively insoluble metal components or an aqueous solution of metal containing water-soluble salts. The latter type of operation is preferred in our second impregnation. The catalytically active components which are deposited on the alumina base include metals of the ion transition group, i.e. cobalt, nickel and iron; the metals of the fifth and sixth period of group VIb, i.e. molybdenum and tungsten; vanadium and their various combinations, particularly combinations of an iron transition metal and molybdenum, tungsten or vanadium. When a metal combination is employed it may be present only in the first impregnation with only a single metal being added in the second impregnation, or vice versa.

When using an aqueous slurry of the metal component it is believed that the small but finite solubility of the substantially water-insoluble compounds of the metals provides effective transfer of the added component to the base material as X-ray and microscopical inspections of the resulting catalysts indicate combination of the catalytically active component with the base apparently through some reaction mechanism. As the substantially water-insoluble salts are usually offered as the carbonate, oxide or hydroxide undesirable extraneous ions are not introduced in the catalyst and thus little or no washing is necessary after impregnation of the base with the catalytically active component. Useable forms of these salts include the bicarbonates, basic carbonates and hydrated oxides. Thus the catalyst can be made as, for instance, by agitating the alumina base and the substantially water-insoluble compounds of the catalytically active component in an aqueous medium for a time sufficient to effect transfer of an effective amount of the catalytic component to the base.

If desired, the metal component may be a water-soluble salt such as a nitrate, molybdate etc. which is contacted in an aqueous solution with the alumina base until the desired constituents have been essentially absorbed, interacted with or precipitated on the catalyst base. Frequently, the soluble salt is in the form of a nitrate. Each added metal component on the base will be an amount sufficient to afford a substantial catalytic effect and will frequently comprise at least about 0.5 weight percent, preferably at least about 1 percent, of the catalyst and the metal components may be up to about 30 weight percent or more of the total catalyst composition. Thus in each impregnation we prefer to add at least about 0.25%, preferably at least about 0.5%, of the given metal component.

Advantageously, the catalyst which is to be treated in accordance with the present invention can be prepared by agitating the substantially water-insoluble inorganic compounds of the catalytically active metals in an aqueous medium with a spray dried alumina hydrate base precursor for a time sufficient to effect deposition on the alumina base of an amount of metal component which affords a substantially catalytic effect. The time necessary to give this result can depend upon the material being deposited as well as the conditions of agitation such as the temperature at which the slurry is digested and in general will be at least about ten minutes. While the slurry is digesting, it is stirred and preferably is at a temperature from about 125° F. to about 190° F. or to about 212° F. Higher temperatures even above 212° F. could be employed, however, no particular advantage is associated with their utilization which overcomes the necessity for employing superatmospheric pressure to maintain a slurry by keeping the water in the liquid phase. Lower temperature such as room temperature and somewhat below can also be employed. For instance, cobalt and molybdenum are effectively deposited on the alumina base when cobalt carbonate, molybdenum trioxide and the alumina hydrate base are digested at room temperature in the aqueous slurry with agitation for about six hours. After the slurry has been digested for the necessary time period it is filtered to obtain the solids which are extruded to the desired shape and size. A preferred catalyst upon extrusion or tabletting may be a macrosize catalyst having a particle size of about 1/16" x 1/16" to about 1/2" x 1" with the preferred dimensions being about 1/16" to 1/8" x 1/16" to 1/8". The catalyst material is then calcined, usually for a period of about 1–10 hours at a temperature from about 850 to 1300° F. or more and prior to calcining the catalyst material may be dried, if desired, for a period of from about 3 to 30 hours at a temperature of from 100° F. to 400° F. The calcined macrosize material is then contacted again with the same or different aqueous metallic constituents, and recalcined for instance for a period of about 1–10 hours at a temperature of from about 850 to 1300° F. If desired, the catalyst material may again be dried prior to recalcining.

The catalyst of this invention can be used in a hydrotreated process such as hydrodesulfurization, hydrofinishing, or hydrocracking of normally liquid petroleum feedstocks. In these systems the feedstock may be contacted with the catalyst at a temperature from about 600 to 900° F. and at a pressure of from about 100 to 5000 p.s.i.g. There is usually free hydrogen addition in the process and if so there is normally a hydrogen recycle rate of from 500 to 10,000 standard cubic ft./barrel of feedstock. The process will normally run at a WHSV of from about .2 to 5. The catalyst may be sulfurized prior to being contacted with petroleum feedstock. The feedstock is of the general class of hydrocarbon petroleum oils such as naphthas and gas oils for desulfurization; lubricating oils and kerosene for hydrotreating; and residuals for hydrocracking.

The following examples will serve to illustrate typical methods of preparation of catalytic compositions by the improved process of this invention. The catalysts were tested for initial catalytic activity (VRA) and aging stability (ARA) in a catalytic desulfurization unit in the presence of free hydrogen using as a feedstock a catalytically cracked light cycle oil, under conditions of 760° F., 450 p.s.i.g., 8 WHSV and 700 s,c,f, $H_2$ recycle gas/bbl. The catalysts were compared with a commercially available $CoO \cdot MoO_3 \cdot Al_2O_3$ catalyst which has a virgin relative activity (VRA) of 100 and an aging stability (ARA) of 40.

EXAMPLE I 1190 grams of alumina hydrate, equivalent to 878 grams of $Al_2O_3$ (about 25–30% $\cdot 3H_2O$), were slurried in 6 liters of water and then heated to 180° F. 90 grams of $MoO_3$ and 60 grams of cobalt carbonate, equivalent to 32 grams of CoO, were added to the mixture and then slurried for about 3 hours at 180° F., filtered and dried at about 230° F. to produce approximately 1,000 grams of a finely divided material having 2.5 percent cobalt and 9 percent $MoO_3$.

EXAMPLE II 307 grams of the resulting product were mixed with 12.28 grams of Sterotex (a tabletting lubricant) and then tabletted to 1/8 inch macrosize pellets. These tablets were then calcined at 900° F. for 6 hours and then calcined at 1050° F. for 2.5 hours. The product had, at 1200° F.; .90 percent volatile matter, 2.58 percent cobalt and 9.12 percent of $MoO_3$. This product had a virgin relative activity of 123 and an accelerated relative activity of 60.

EXAMPLE III 228 grams of the product of Example I were calcined for 2½ hours at 1050° F. and then cooled and impregnated with 749 ml. of a solution containing 14.75 grams of $Co(NO_3)_2 \cdot 6H_2O$ and 13.1 grams

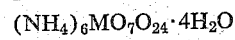
$(NH_4)_6Mo_7O_{24} \cdot 4H_2O$ to form a product having 3.75 percent cobalt and 13.5 percent $MoO_3$. This product was then blended with a quantity of Sterotex equal to about 4 percent of the composition by weight, pelleted to 1/8 inch x 1/8 inch size and then calcined at 900° F. for 6 hours and then calcined at 1050° F. for 2½ hours. The catalyst had 0.3 percent volatile matter at 1200° F., 3.74 percent cobalt and 13.3 percent $MoO_3$. Testing of the catalyst showed a virgin relative activity of 147 and accelerated relative activity of 65.

EXAMPLE IV 122 grams of product of Example II were evacuated for 1 hour in a 28 inch vacuum into which was then introduced 200 ml. of a solution containing 17.3 grams of $Co(NO_3)_2 \cdot 6H_2O$ and 15.7 grams of

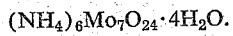
$(NH_4)_6Mo_7O_{24} \cdot 4H_2O$.

The vacuum was then broken and the constituents allowed to stand for 2 minutes and then drained and dried at 230° F. The constituents were then calcined for 2½ hours at 1050° F. The product analyzed 1.02 percent volatile matter at 1200° F., 3.74 percent cobalt and 13.3 percent $MoO_3$. Testing of the catalyst showed a virgin relative activity of 172 and an accelerated relative activity of 78.2.

Thus, it is seen from the above examples that the catalyst made according to the process of the present invention, see Example IV, supplies the petroleum industry with a superior catalyst having improved initial catalytic activity (VRA) and also a superior ability to retain its catalyst activity (ARA) when compared with other generally similar catalyst materials. Thus in Example III an inferior doubly impregnated catalyst was prepared, apparently since the second impregnation preceded rather than followed tabletting.

EXAMPLE V 200 grams of a commercial $CoO \cdot MoO_3 \cdot Al_2O_3$ catalyst material prepared by promoting metal impregnation of a finely divided $Al_2O_3$ hydrate, extrusion, drying and calcination and having 2.41 percent cobalt and 8.51 percent $MoO_3$, were contacted with a solution containing 98.8 g. per liter of $Co(NO_3)_2 \cdot 6H_2O$ and 48.8 g. per liter $(NH_4)_6Mo_7O_{14} \cdot 4H_2O$ for 15 minutes, dried for 20 hours at 110° C. and then calcined in a muffle furnace for 2½ hours at 1050° F. The product had the following properties:

VM at 1200° F. 1.36%; Co 3.96%; and MoO₃ 12.7%; VRA 155; ARA 76.

EXAMPLE VI 500 grams of the commercial CoO·MoO₃·Al₂O₃ catalyst material of Example V having 2.41 percent cobalt and 8.51 percent MoO₃ were contacted with a solution containing 98.8 g. per liter of Co(NO₃)₂·6H₂O per liter, drained, dried for 20 hours at 110° C. and then calcined in a muffle furnace for 2½ hours at 1050° F. The product had the following properties:

VM at 1200° F. 0.60%; Co 3.94%; and MoO₃ 8.66%.

EXAMPLE VII 500 grams of the commercial CoO·MoO₃·Al₂O₃ catalyst material of Example V having 2.41 percent cobalt and 8.51 percent MoO₃ were contacted with a solution containing 48.8 g. per liter of (NH₄)₆Mo₇O₂₄·4H₂O for 15 minutes drained, dried for 20 hours at 110° C. and then calcined in a muffle furnace for 2½ hours at 1050° F. The product had the following properties:

VM at 1200° F. 0.11%; Co 2.34%; and MoO₃ 12.4%.

The virgin relative activity and the accelerated relative activity were tested under the conditions shown above and the results are given in Table I.

Table I

|  | Percent Co | Percent MoO₃ | VRA | ARA |
|---|---|---|---|---|
| Commercial CoO·MoO₃·Al₂O₃ Used in Examples V to VII | 2.41 | 8.51 | 83 | 47 |
| Example V | 3.96 | 12.7 | 155 | 76 |
| Example VI | 3.94 | 8.66 | 79 | 64 |
| Example VII | 2.34 | 12.4 | 135 | 64 |

Thus, it is seen that, while reimpregnation of the catalyst particles with one metal results in improved VRA and ARA, substantially better VRA and ARA are obtained by using more than one metal constituent. An increase in ARA seems particularly significant since an improvement in the level of catalyst activity over a substantial period of time is indicative of a lasting benefit.

The above examples are illustrative of other catalysts which can be made in our invention. In such preparations nickel carbonate or nitrate can replace the corresponding cobalt salts and tungsten oxide can be used instead of molybdenum trioxide. Also ammonium vanadate can be employed rather than ammonium paramolybdate.

We claim:

1. In a method of preparing alumina-based catalysts containing metal components, the steps comprising contacting finely divided alumina with an aqueous catalytic promoting metal component selected from the group consisting of metals from the iron transition group, metals from the fifth and sixth periods of group VIb and vanadium, forming macrosize particles of about 1/16" to ½" in diameter and about 1/16" to 1" in length from the mixture, calcining the macrosize particles, contacting the macrosize particles with an aqueous catalytic promoting metal component selected from the group consisting of metals from the iron transition group, metals of the fifth and sixth periods of Group VIb and vanadium and recalcining the macrosize particles.

2. The method of claim 1 wherein the alumina is in hydrate form.

3. The method of claim 2 wherein the metal components include cobalt and molybdenum.

4. In a method of preparing alumina-based catalysts containing metal components, the steps comprising contacting finely divided alumina hydrate with an aqueous slurry containing a substantially water-insoluble catalytic promoting metal component selected from the group consisting of metals from the iron transition group, metals of the fifth and sixth period of group VIb and vandium, forming the mixture to macrosize particles of about 1/16" to ½" in diameter and about 1/16" to 1" in length, drying the macrosize particles, calcining the macrosize particles, contacting the macrosize particles with an aqueous solution containing a catalytic promoting metal component selected from the group consisting of metals from the iron transition group, metals from the fifth and sixth periods of group VIb and vanadium, drying the macrosize particles, and calcining the macrosize particles.

5. The process of claim 4 wherein the metal components include cobalt and molybdenum.

References Cited in the file of this patent

UNITED STATES PATENTS

| 2,687,381 | Hendricks | Aug. 24, 1954 |
| 2,898,308 | Teter et al. | Aug. 4, 1959 |
| 2,968,634 | Nahin | Jan. 17, 1961 |
| 3,016,347 | O'Hara | Jan. 9, 1962 |